(12) United States Patent
Diao et al.

(10) Patent No.: US 11,336,092 B2
(45) Date of Patent: *May 17, 2022

(54) MULTI-OBJECTIVE REAL-TIME POWER FLOW CONTROL METHOD USING SOFT ACTOR-CRITIC

(71) Applicants: Ruisheng Diao, Richland, WA (US); Di Shi, San Jose, CA (US); Bei Zhang, San Jose, CA (US); Siqi Wang, San Jose, CA (US); Haifeng Li, Nanjing (CN); Chunlei Xu, Nanjing (CN); Desong Bian, San Jose, CA (US); Jiajun Duan, San Jose, CA (US); Haiwei Wu, Nanjing (CN)

(72) Inventors: Ruisheng Diao, Richland, WA (US); Di Shi, San Jose, CA (US); Bei Zhang, San Jose, CA (US); Siqi Wang, San Jose, CA (US); Haifeng Li, Nanjing (CN); Chunlei Xu, Nanjing (CN); Desong Bian, San Jose, CA (US); Jiajun Duan, San Jose, CA (US); Haiwei Wu, Nanjing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/092,478

(22) Filed: Nov. 9, 2020

(65) Prior Publication Data
US 2021/0367424 A1  Nov. 25, 2021

Related U.S. Application Data

(60) Provisional application No. 63/027,228, filed on May 19, 2020.

(51) Int. Cl.
*H02J 3/00* (2006.01)
*G05B 13/04* (2006.01)
*G05B 13/02* (2006.01)

(52) U.S. Cl.
CPC ............ *H02J 3/001* (2020.01); *G05B 13/027* (2013.01); *G05B 13/04* (2013.01); *H02J 2203/20* (2020.01)

(58) Field of Classification Search
CPC .... H02J 3/001; H02J 2203/20; G05B 13/027; G05B 13/04
USPC ........................................................ 700/298
See application file for complete search history.

(56) References Cited

U.S. PATENT DOCUMENTS

2013/0268131 A1* 10/2013 Venayagamoorthy .... G05F 5/00
700/286

OTHER PUBLICATIONS

IEEE—Deep Reinforcement Learning for Power System Applications: An Overview) By: Zidong Zhang (Year: 2020).*

(Continued)

*Primary Examiner* — Jigneshkumar C Patel
(74) *Attorney, Agent, or Firm* — Patent PC; Bao Tran (57) ABSTRACT

Systems and methods are disclosed for control voltage profiles, line flows and transmission losses of a power grid by forming an autonomous multi-objective control model with one or more neural networks as a Deep Reinforcement Learning (DRL) agent; training the DRL agent to provide data-driven, real-time and autonomous grid control strategies; and coordinating and optimizing power controllers to regulate voltage profiles, line flows and transmission losses in the power grid with a Markov decision process (MDP) operating with reinforcement learning to control problems in dynamic and stochastic environments.

20 Claims, 5 Drawing Sheets

(56) References Cited

OTHER PUBLICATIONS

IEEE—Coordination of PV Smart Inverters Using Deep Reinforcement Learning for Grid Voltage Regulation, By: Chngfu Li (Year: 2019).*

IEEE—Power Management of Wireless Sensor Nodes with Coordinated Distributed Reinforcement Learning, 2019 IEEE 37th International Conference on Computer Design (ICCD), By: Shaswot Shresthamali, (Year: 2019).*

IEEE: Multi-agent Cooperation by Reinforcement Learning with Teammate Modeling and Reward Allotment, 2011 Eighth International Conference on Fuzzy Systems and Knowledge Discovery (FSKD)), By: Zhou Pucheng (Year: 2011).*

* cited by examiner

MULTI-OBJECTIVE REAL-TIME POWER FLOW CONTROL METHOD USING SOFT ACTOR-CRITIC

The present application claims priority to Provisional Application 63/027,228 filed 19 May 2020, the content of which is incorporated by reference.

TECHNICAL FIELD

This invention relates to autonomous multi-objective control of power flow in power systems

BACKGROUND

Over recent years, the electricity sector has undergone significant changes, with ever-increasing penetration of intermittent energy resources, storage devices, and power electronics equipment integrated into both transmission and distribution grids, causing more stochastic and dynamic behavior that affects the secure and economic operation of the grid. Various control measures exist to restore the imbalance of active and reactive power to ensure voltage, frequency and line flows operating within their normal ranges. Compared to mature controllers that function well at local levels, deriving system-wide optimal controls by coordinating many controllers for real-time operating conditions while complying with all security constraints remains a grand challenge.

Such a control problem is known as security constrained AC optimal power flow (ACOPF), where objectives can be minimization of total generation costs, total network losses, amount of control actions or a combination of all. Many prior research efforts were proposed to solve the large-scale non-convex ACOPF problem considering various constraints with mixed-integer variables, including nonlinear programming, quadratic programming, Lagrangian relaxation, interior point method and mixed-integer linear programing. However, due to the non-convex and complex nature of the problem (NP-Hard), deriving solutions for the ACOPF problem with all security constraints in real-time environment is very challenging. Thus, relaxation of constraints and simplifications of system models, e.g., DC based OPF, are typically used to obtain feasible and suboptimal solutions. In fact, nearly all software vendor's tools adopt DC-based models for obtaining fast OPF solutions in ISOs and power utilities. To effectively deal with the new challenges and derive fast OPF solutions, new approaches are much-needed.

SUMMARY OF THE INVENTION

In one aspect, systems and methods are disclosed to control voltage profiles, line flows and transmission losses of a power grid by forming an autonomous multi-objective control model with one or more neural networks as Deep Reinforcement Learning (DRL) agents; training the DRL agents to provide data-driven, real-time and autonomous grid control strategies; and coordinating and optimizing power controllers to regulate voltage profiles, line flows and transmission losses in the power grid with a Markov decision process (MDP) operating with reinforcement learning to control problems in dynamic and stochastic environments.

In another aspect, systems and methods are disclosed to control voltage profiles, line flows and transmission losses of a power grid that includes measuring states of a power grid; determining abnormal voltage and line flow conditions and locating affected areas in the power grid; creating representative operating conditions including contingencies for the power grid; conducting power grid simulations in an offline or online environment; training deep-reinforcement-learning-based agents for autonomously controlling power grid voltage profiles, line flows and transmission losses; and coordinating and optimizing control actions of power controllers in the power grid.

In a further aspect, systems and methods are disclosed to control voltage profiles, line flows and transmission losses of a power grid includes measuring states of a power grid from EMS system, determining abnormal voltage and line flow conditions and locating the affected areas in a power network, creating massive representative operating conditions considering various contingencies, simulating a large number of scenarios, training effective deep-reinforcement-learning-based agents for autonomously controlling power grid voltage profiles, line flows and transmission losses, improving control performance of the trained agents, coordinating and optimizing control actions of all available power resources, and generating effective data-driven, autonomous control commands for correcting voltage and line flow issues.

In yet another aspect, a generalized framework for providing data-driven, autonomous control commands for regulating voltages, line flows, and transmission losses in a power network under normal and contingency operating conditions. The embodiment is used to create representative operating conditions of a power grid by interacting with various power flow solvers, simulate contingency conditions, and train different types of DRL-based agents for various objectives in providing autonomous control commands for real-time operation of a power grid.

In one embodiment, the method includes updating a relationship among action, states and reward in an agent's non-transitory memory.

Advantages of the system may include one or more of the following. The system can significantly improve control effectiveness in regulating voltage profiles, line flows and transmission losses in a power grid under normal and contingency conditions. The novelty of the proposed method includes: (1) the ACOPF problem is formulated as Markov Decision Process (MDP) where reinforcement learning based algorithms can be applied to derive suboptimal solutions; (2) it provides a general and flexible framework to include various types of control objectives and constraints when training effective AI agents; During the training process, the agent is capable of self-learning by exploring more control options in a high dimension by jumping out of local optima and therefore improves its overall performance. (3) once properly trained, the AI agent can provide subsecond control actions to regulate bus voltages and transmission losses once sensing the current system states, in case of abrupt changes in voltages and line flows; and (4) multi-threading-based training process of SAC agents with periodical model update is developed to ensure long-term control effectiveness and mitigate the overfitting issue.

DETAILED DESCRIPTION OF THE ILLUSTRATED EMBODIMENTS

Without losing generality, this embodiment mainly targets at deriving real-time corrective operational control decisions for the actual system operating conditions at an interval of 5 minutes in a control center. The control objectives include regulating bus voltages within their secure zones and minimizing transmission line losses while respecting power flow equations and physical constraints, e.g., line ratings, limits of generators. The mathematical formulation of the control problem is given below:

Objective:

$$\text{minimize } \Sigma_{i,j}^{N} Ploss_{i,j}, (i,j) \in \Omega_L \quad (1)$$

Subject to:

$$\Sigma_{n \in Gi} P_n^g - \Sigma_{m \in Di} P_m^d - g_i V_i^2 = \Sigma_{j \in B_i} P_{ij}(y), i \in B \quad (2)$$

$$\Sigma_{n \in Gi} Q_n^g - \Sigma_{m \in Di} Q_m^d - b_i V_i^2 = \Sigma_{j \in B_i} QP_{ij}(y), i \in B \quad (3)$$

$$P_n^{min} \leq P_n \leq p_n^{max}, n \in G \quad (4)$$

$$Q_n^{min} \leq Q_n \leq Q_n^{max}, n \in G \quad (5)$$

$$V_i^{min} \leq V_i \leq V_i^{max}, i \in B \quad (6)$$

$$P_{ij}^2 + Q_{ij}^2 \leq S_{ij}^{max}, (i,j) \subset \Omega_L \quad (7)$$

where Eqs. (2) and (3) represent active and reactive power flow equations, respectively. Eqs. (4) and (5) are active and reactive power output constraints of each generator, respectively. Eqs. (6) and (7) specify bus voltage secure zones and line flow limits of a power system to be controlled, respectively.

A. Overall Flowchart of the Proposed Methodology

Figure 1:
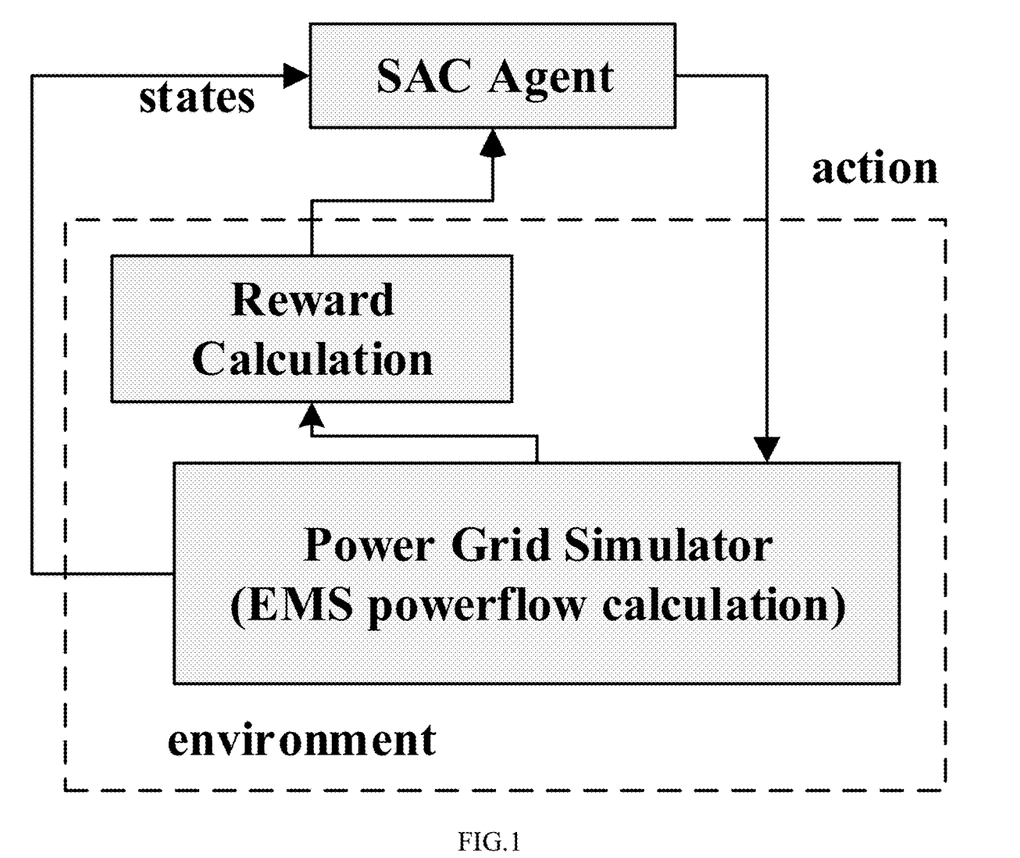
FIG. 1 shows an exemplary framework of the interaction between SAC agents and power grid simulation environment.

Deriving multi-objective real-time control actions can be formulated as a discrete-time stochastic control process, a.k.a., MDP. Among various DRL techniques, the off-policy SAC method is adopted because of its superior performance in fast convergence and robustness, which maximizes the expected reward by exploring as many control actions as possible, leading to a better chance of finding optimum. FIG. 1 provides the interaction process between the power grid environment (EMS AC power flow solver) and the SAC agent, where the environment receives control action, outputs the corresponding next system states and calculates the reward, and the SAC agent receives states and reward before outputting control actions.

Figure 2:
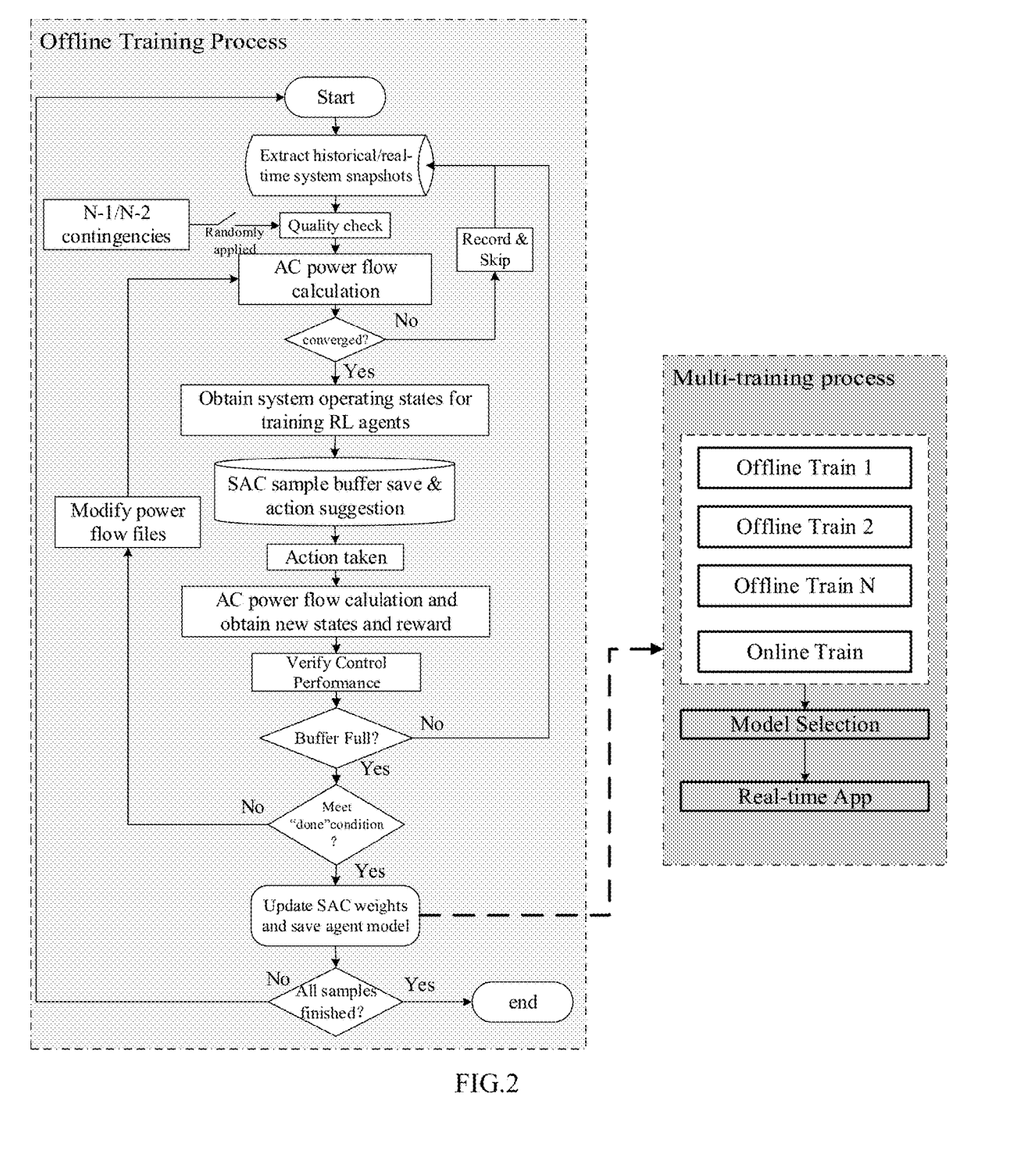
FIG. 2 shows an exemplary framework for multi-objective autonomous controls for grid operation using deep reinforcement learning, including multiple offline training processes, online training process and real-time utilization process.

The main flowchart of the proposed methodology is depicted in FIG. 2. The left side of FIG. 2 shows the offline training process of a SAC agent. Representative system operating snapshots are collected from EMS for preprocessing. System state variables are extracted from those converged snapshots and fed into SAC agent training submodule, where neural networks are used to establish direct mapping between system states and control actions. The controls are then verified by another AC power flow solution to calculate reward values before updating SAC agent weights for maximizing long-term expected reward. To ensure long-term effectiveness and robustness of SAC agent, multiple training processes with different sets of hyperparameters are launched simultaneously, including several offline training processes and one online training process (initialized by the best offline-trained model), shown in the right side of FIG. 2. The best-performing model from these processes is selected for application in real-time environment.

B. Training Effective SAC Agents

To train effective DRL agents for multi-objective real-time power flow control, one needs to carefully define several key elements, including:

1) Episode and Terminating Conditions

Each episode is defined as a quasi-steady-state operating snapshot, obtained from the EMS system and saved in text files. Termination condition of a training episode can be: i) no more voltage or thermal violations & reduction of transmission losses reaching a threshold, e.g., 0.5%; ii) power flow diverges; or iii) the maximum number of control iteration is reached.

2) State Space

The action space is formed by including bus voltage magnitudes, phase angles, active and reactive power on transmission lines. Batch normalization technique is applied to different types of variables for maintaining consistency and improving model training efficiency.

3) Control Space

In this work, conventional generators are used to regulate voltage profiles and transmission line losses. A control vector is then created to include voltage set points at each power plant as continuous values, e.g., [0.9,1.1] p.u.

4) Reward Definition

The reward value at each control iteration when training SAC agent adopts the following logic:

If voltage or flow violation is detected:

$$\text{reward} = -\frac{\text{dev\_overflow}}{10} - \frac{\text{vio\_voltage}}{100}$$

else if delta_p_loss<0:

reward=50−delta_p_loss*1000 else if delta_p_loss>=0.02 reward=−100 else: reward=−1−(p_loss−p_loss_pre)*50 where dev_overflow=$\Sigma_i^{N}$ (Sline(i)−Sline_max(i))$^2$; N is the total number of lines with thermal violation; Sline is the apparent power of line; Sline_max is the limit of line apparent power; vio_voltage=$\Sigma_j^{M}$(Vm(j)−Vmin)*(Vm(j)−Vmax); M is the total number of buses with voltage violation;

$$\text{delta\_p\_loss} = \frac{\text{p\_loss} - \text{p\_loss\_pre}}{\text{p\_loss\_pre}};$$

p_loss is the present transmission loss value and p_loss_pre is the line loss at the base case. The details of training SAC agents are given in Algorithm I, shown below.

Algorithm I: Soft Actor-Critic Training Process
for Multi-Objective Power Flow Control 1. Initialize weights of neural networks, θ and φ, for policy π(s, a) and value function V(s), respectively; initialize weights ψ and $\bar{\psi}$ for the two Q(s, a) functions; initialize replay buffer D ; set up training environment, env
2. for: k = 1, 2, ... (k is the counter of episodes for training)
3.     for: t =1,2,... (t stands for control iteration)
4.         reset environment s ← env.reset( )
5.         obtain states and actions a ~ π(· |$s_t$)
6.         apply action a and obtain the next states $s_{t+1}$, reward value r and termination signal done
7.         store tuple<$s_t$, $a_t$, $r_t$, $s_{t+1}$, done > in D
8.         $s_t$ = $s_{t+1}$
9.         if satisfying policy updating conditions, conduct
10.            for a required number of policy updates, conduct
11.                randomly sample from D, < $s_t$, $a_t$, r, $s_{t+1}$, done >
12.                update Q function, Q(s, a): $\theta_i$ ← $\theta_i$ − $\lambda_Q \nabla J_Q(\theta_i)$
13.                update value function V(s): ψ ← ψ − $\lambda_V \nabla J_V(\psi)$
14.                update policy network π(s, a): φ ← φ − $\lambda_\pi \nabla J_\pi(\phi)$
15.                update target network $\bar{\psi}$ ← τψ + (1 − τ)$\bar{\psi}$
16.                update temperature coefficient, a In one implementation, the system uses a 4-tuple to formulate the MDP:

$$(S, A, P_a, R_a)$$

where S is a vector of system states, A is a list of actions to be taken, $P_a$(s, s')=Pr($s_{t+1}$=s'|$s_t$=s, $a_t$=a) represents a transition probability from a current state $s_t$ to a new state, $s_{t+1}$, after taking an action a at time=t, and $R_a$(s, s') is a reward received after reaching state s' from a previous state s to quantify control performance. The system includes providing a sub-second control with an EMS or PMU data stream from a wide area measurement system (WAMS). The system can apply a decaying E-greedy method for learning, with a decaying probability of E, to make a random action selection at an $i^{th}$ iteration, wherein $\varepsilon_i$ is updated as $$\varepsilon_{i+1} = \begin{cases} r_d \times \varepsilon_i, & \text{if } \varepsilon_i > \varepsilon_{min} \\ \varepsilon_{min}, & \text{else} \end{cases}$$

an $r_d$ is a constant decay rate.

The proposed SAC-based methodology for multi-objective power flow control was developed and deployed in the control center of SGCC Jiangsu Electric Power Company. For demonstrating its effectiveness, the city-level high-voltage (220 kV+) power network is used, which consists of 45 substations, 5 power plants (with 12 generators) and around 100 transmission lines, serving electricity to the city of Zhangjiagang. Massive historical operating snapshots (full topology node/breaker models for Jiangsu province with ~1500 nodes and ~420 generators, at an interval of 5 minutes) were obtained from their EMS system (named D5000 system) where the AC power flow computational module is used as grid simulation environment to train SAC agents. The control objectives are set to minimize transmission losses (at least 0.5% reduction) without violating bus voltages ([0.97-1.07] pu) and line flow limits (100% of MVA rating). Voltage setpoints of the 12 generators in 5 power plants are adjusted by the SAC agent.

Figure 3:
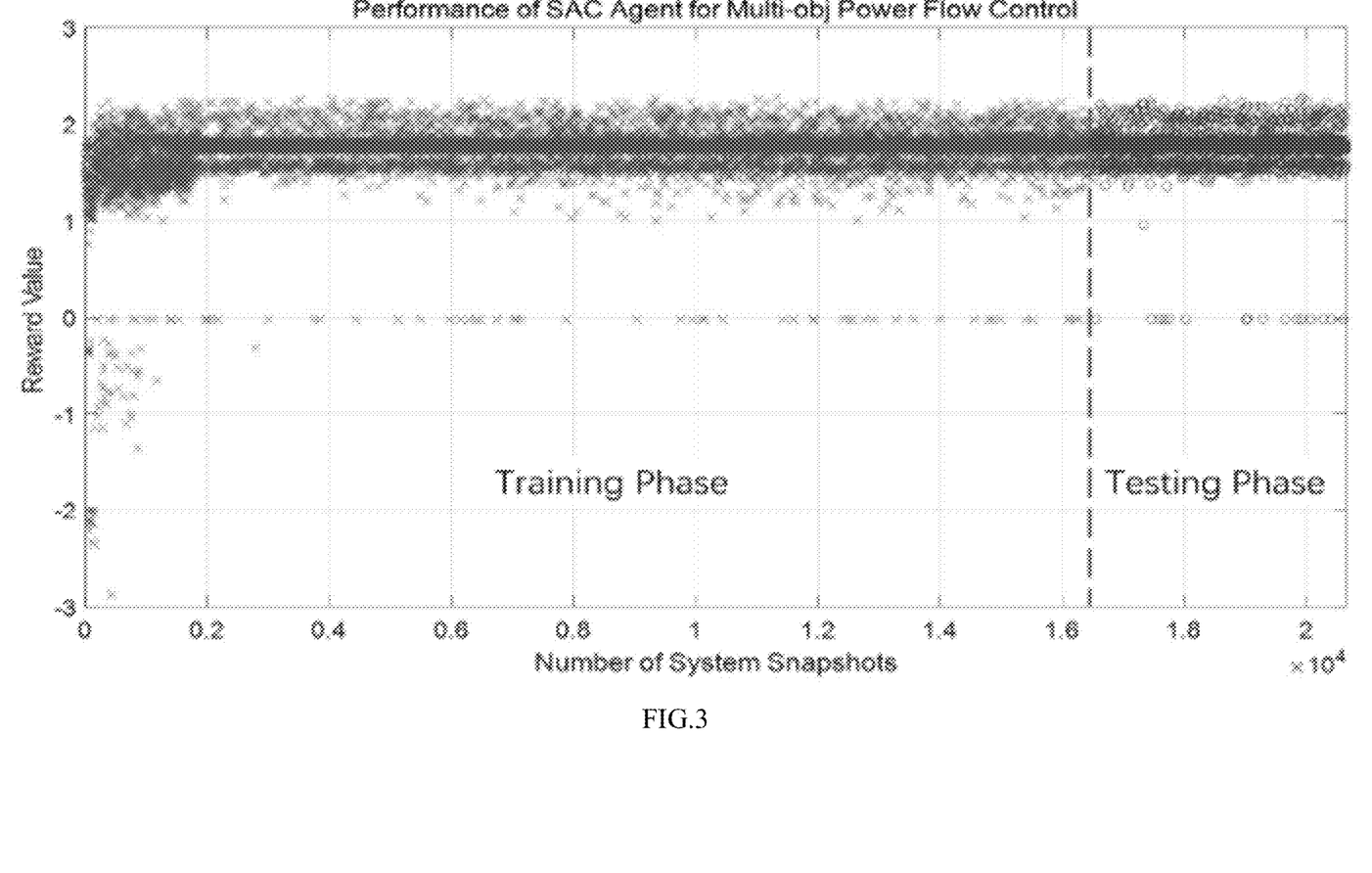
FIG. 3 shows an exemplary SAC agent performance in controlling voltage profiles and line losses in the DRL-based autonomous control method for a power grid.
Figure 4:
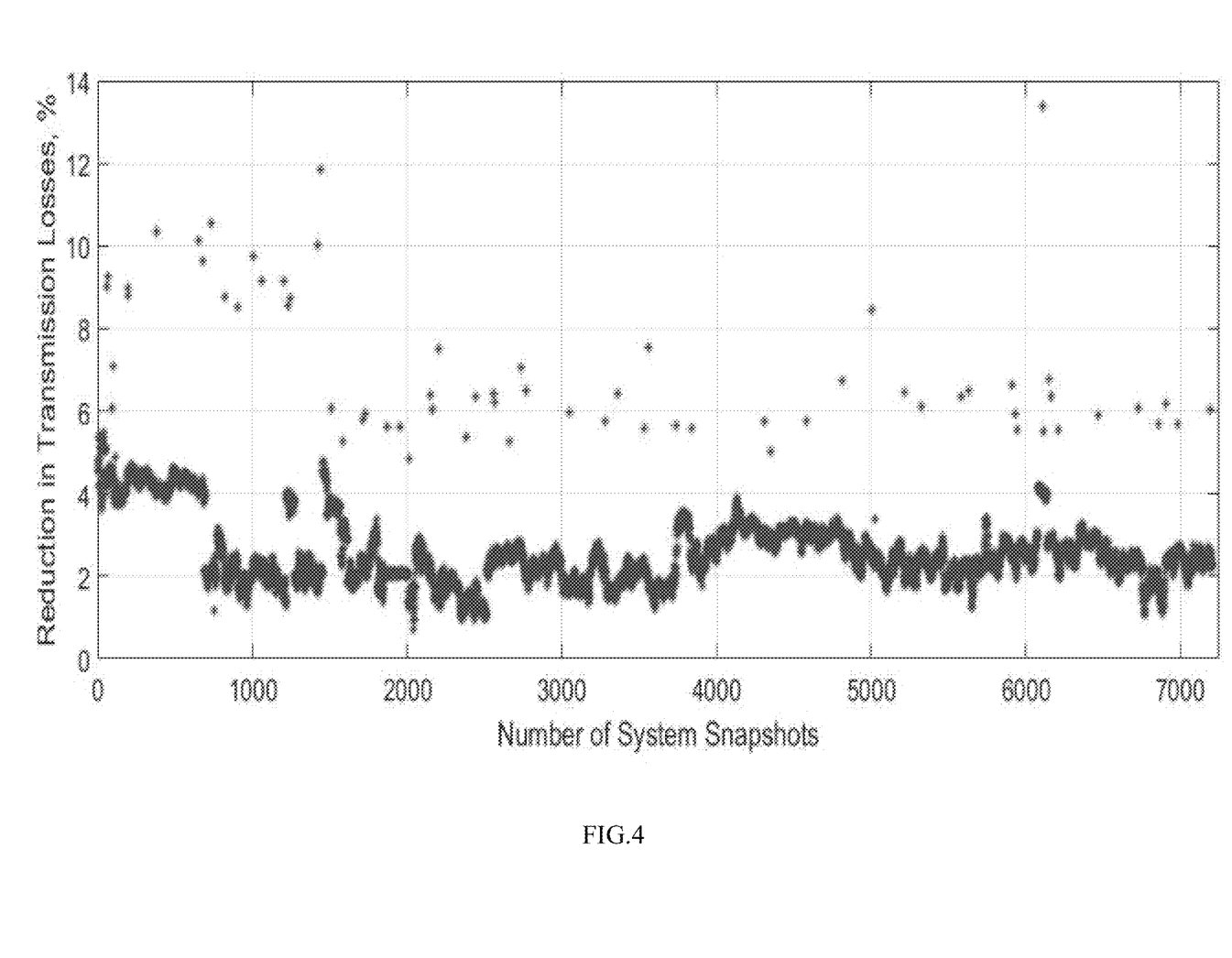
FIG. 4 shows an exemplary chart showing reduction in transmission losses.

The performance of training and testing SAC agents using a time series of actual system snapshots is illustrated in FIG. 3 and FIG. 4. From 12/3/2019 to 1/13/2020, 7,249 operating snapshots were collected. Two additional copies of the original snapshots were created and randomly shuffled to create a training set (80%) and a test set (20%). For the first ~150 snapshots, the SAC agent struggles to find effective policies (with negative reward values), however, achieves satisfactory performance thereafter. Several training processes are simultaneously launched and updated twice a week to ensure control performance. For real-time application during this period, the developed method provides valid controls for 99.41% of these cases. The average line loss reduction is 3.6412% (compared to the line loss value before control actions). There are 1,019 snapshots with voltage violations, in which SAC agent solves 1,014 snapshots completely and effectively mitigates the remaining 5 snapshots.

Figure 5:
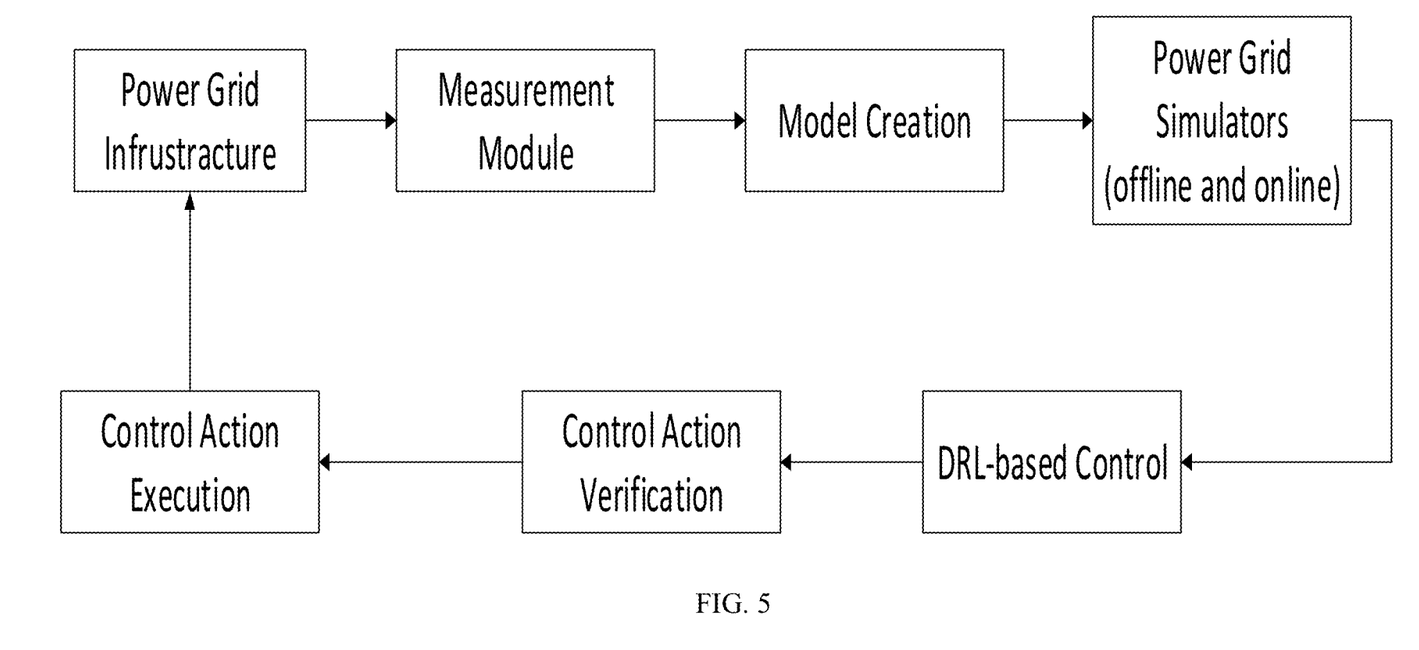
FIG. 5 shows an exemplary power grid control system using the above framework.

An example of test bed can be found in FIG. 5. The test bed models the exemplary Power Grid and Sensor Network where data collected from energy management system (EMS) or phasor measurement unit (PMU) is transmitted through communication networks to the data server. The data server stores and manages the measured data and provides data pipeline to the application server. The pre-trained reinforcement learning model is running on the application server. The control command and expected performance is sent to the user interface and shown to the users. The test bed running the method of FIG. 2 has a framework is modeled by the following:

forming an autonomous multi-objective control model with one or more neural networks as a Deep Reinforcement Learning (DRL) agent;
   training the DRL agent to provide data-driven, real-time and autonomous grid control strategies; and
   coordinating and optimizing power controllers to regulate voltage profiles, line flows and transmission losses in the power grid with a Markov decision process (MDP) operating with reinforcement learning to control problems in dynamic and stochastic environments.

The system supports training effective SAC agents with periodic updating for multi-objective power flow control in real-time operational environment. The detailed design and flowchart of the proposed methodology are provided for reducing transmission losses without violating voltage and line constraints. Numerical simulations conducted on a real power network in real-time operational environment demonstrates the effectiveness and robustness.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As used herein, the term "module" or "component" may refer to software objects or routines that execute on the computing system. The different components, modules, engines, and services described herein may be implemented as objects or processes that execute on the computing system (e.g., as separate threads). While the system and methods described herein may be preferably implemented in software, implementations in hardware or a combination of software and hardware are also possible and contemplated. In this description, a "computing entity" may be any computing system as previously defined herein, or any module or combination of modulates running on a computing system. All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method to control voltage profiles, line flows and transmission losses of a power grid, comprising:
   forming an autonomous multi-objective control model with one or more neural networks as a Deep Reinforcement Learning (DRL) agent using a soft actor critic with multiple control objectives including regulating bus voltages within power zones and minimizing transmission line losses while respecting power flow equations and physical constraints;
   training the DRL agent to provide data-driven, real-time and autonomous grid control strategies; and
   coordinating and optimizing power controllers to regulate voltage profiles, line flows and transmission losses in the power grid with a Markov decision process (MDP) operating with reinforcement learning with the soft actor critic and updating a policy network and temperature coefficient to control problems in dynamic and stochastic environments.

2. The method of claim 1, wherein the DRL agents are trained offline by interacting with offline simulations and historical events which are periodically updated.

3. The method of claim 1, wherein the DRL agent provides autonomous control actions once abnormal conditions are detected.

4. The method of claim 1, wherein after an action is taken in the power grid $a_t$ a current state, the DRL agent receives a reward from the power grid.

5. The method of claim 1, comprising updating a relationship among action, states and reward in an agent's non-transitory memory.

6. The method of claim 1, comprising solving a coordinated voltage, line flows and transmission losses control problem.

7. The method of claim 6, comprising performing a Markov Decision Process (MDP) that represents a discrete time stochastic control process.

8. The method of claim 6, comprising using a 4-tuple to formulate the MDP:

$$(S, A, P_a, R_a)$$

where S is a vector of system states, A is a list of actions to be taken, $P_a(s, s') = \Pr(s_{t+1} = s' | s_t = s, a_t = a)$ represents a transition probability from a current state $s_t$ to a new state, $s_{t+1}$, after taking an action a at time=t, and $R_a(s, s')$ is a reward received after reaching state s' from a previous state s to quantify control performance.

9. The method of claim 1, wherein the DRL agent comprises two architecture-identical deep neural networks including a target network and an evaluation network.

10. The method of claim 1, comprising providing a sub-second control with an EMS or PMU data stream from a wide area measurement system (WAMS).

11. The method of claim 1, wherein the DRL agent self-learns by exploring control options in a high dimension by moving out of local optima.

12. The method of claim 1, comprising performing voltage control, line flow control and transmission loss control by the DRL agent by considering multiple control objectives and security constraints.

13. The method of claim 1, wherein a reward is determined based on voltage operation zones with voltage profiles, including a normal zone, a violation zone, and a diverged zone.

14. The method of claim 1, comprising applying a decaying ε-greedy method for learning, with a decaying probability of $\varepsilon_i$ to make a random action selection at an $i^{th}$ iteration, wherein $\varepsilon_i$ is updated as $$\varepsilon_{i+1} = \begin{cases} r_d \times \varepsilon_i, & \text{if } \varepsilon_i > \varepsilon_{min} \\ \varepsilon_{min}, & \text{else} \end{cases}$$

an $r_d$ is a constant decay rate.

15. A method to control voltage profiles, line flows and transmission losses of a power grid, comprising:
   measuring states of a power grid;
   determining abnormal conditions and locating affected areas in the power grid;
   creating representative operating conditions including contingencies for the power grid;
   conducting power grid simulations in an offline or online environment;
   training deep-reinforcement-learning-based agents using a soft actor critic with multiple control objectives including regulating bus voltages within power zones and minimizing transmission line losses while respecting power flow equations and physical constraints for autonomously controlling power grid voltage profiles, line flows and transmission losses; and
   coordinating and optimizing control actions of power controllers in the power grid with the soft actor critic and updating a policy network and temperature coefficient.

16. The method of claim 15, wherein the measuring states comprises measuring from phasor measurement units or energy management systems.

17. The method of claim 15, comprising generating data-driven, autonomous control commands for correcting voltage issues and line flow issues considering contingencies in the power grid.

18. The method of claim 15, comprising presenting expected control outcomes once one or more DRL-based commands are applied to a power grid.

19. The method of claim 15, comprising providing a sub-second control with a phasor measurement unit (PMU) data stream from a wide area measurement system.

20. The method of claim 15, comprising providing a platform for data-driven, autonomous control commands for regulating voltages, line flows, and transmission losses in a power network under normal and contingency operating conditions.

* * * * *